(12) United States Patent
Kitaoka et al.

(10) Patent No.: US 10,459,139 B2
(45) Date of Patent: Oct. 29, 2019

(54) LIGHTING APPARATUS

(71) Applicant: PANASONIC INTELLECTUAL PROPERTY MANAGEMENT CO., LTD., Osaka (JP)

(72) Inventors: Shinichi Kitaoka, Osaka (JP); Hideharu Kawachi, Hyogo (JP); Sachiko Azuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 101 days.

(21) Appl. No.: 15/728,966

(22) Filed: Oct. 10, 2017

(65) Prior Publication Data

US 2018/0106944 A1 Apr. 19, 2018

(30) Foreign Application Priority Data

Oct. 18, 2016 (JP) .................. 2016-204490

(51) Int. Cl.
| | |
|---|---|
| *F21V 17/12* | (2006.01) |
| *F21V 8/00* | (2006.01) |
| *F21K 9/64* | (2016.01) |
| *F21V 5/04* | (2006.01) |
| *G02B 6/44* | (2006.01) |
| *F21V 9/30* | (2018.01) |
| *F21Y 115/30* | (2016.01) |

(52) U.S. Cl.
CPC .............. *G02B 6/0008* (2013.01); *F21K 9/64* (2016.08); *F21V 5/04* (2013.01); *F21V 9/30* (2018.02); *F21V 17/12* (2013.01); *G02B 6/443* (2013.01); *F21Y 2115/30* (2016.08)

(58) Field of Classification Search
CPC .... G02B 6/0008; G02B 6/443; G02B 6/0005; G02B 6/0003; G02B 6/0001; F21K 9/64; F21V 9/30; F21V 5/04; F21V 17/12; F21V 2200/00; F21V 2200/10; F21V 2200/13; F21V 17/10; F21V 17/00; F21Y 2115/30
See application file for complete search history.

(56) References Cited

U.S. PATENT DOCUMENTS

| | | | | |
|---|---|---|---|---|
| 9,528,684 | B2 * | 12/2016 | Tamura | ............... H01S 5/005 |
| 2015/0103554 | A1 | 4/2015 | Tamura et al. | |
| 2016/0084451 | A1 * | 3/2016 | Annen | ............ G02B 6/0006 362/553 |
| 2016/0146415 | A1 * | 5/2016 | Suzuki | ............ G02B 6/0006 362/553 |
| 2018/0081182 | A1 * | 3/2018 | Takahashi | ........... G02B 19/00 |

FOREIGN PATENT DOCUMENTS

JP 2014-10908 1/2014

* cited by examiner

*Primary Examiner* — Bao Q Truong
(74) *Attorney, Agent, or Firm* — Greenblum & Bernstein, P.L.C.

(57) ABSTRACT

A lighting apparatus that wavelength-converts laser light guided by an optical fiber to output light having a different wavelength as the laser light, includes: a holder that holds the optical fiber; a wavelength converter that wavelength-converts the laser light emitted from the optical fiber; and a case that holds the wavelength converter and houses the holder. The holder includes a straight groove into which one end of the optical fiber is fitted.

7 Claims, 9 Drawing Sheets

LIGHTING APPARATUS

CROSS REFERENCE TO RELATED APPLICATION

This application claims the benefit of priority of Japanese Patent Application Number 2016-204490 filed on Oct. 18, 2016, the entire content of which is hereby incorporated by reference.

BACKGROUND

1. Technical Field

The present disclosure relates to lighting apparatuses to which an optical fiber is attached.

2. Description of the Related Art

Conventionally, there are lighting apparatuses that illuminate by causing a phosphor to emit light using laser light guided by an optical fiber as excitation light, and converting the emitted light into light of a desired color (see, for example, Japanese Unexamined Patent Application Publication No. 2014-10908). In such lighting apparatuses, the positioning of an end of the optical fiber is typically carried out by holding the end of the optical fiber using a ferrule.

SUMMARY

However, since a ferrule is a comparatively expensive component, positioning the end of an optical fiber stably without a ferrule is desired.

In view of this, the present disclosure provides a lighting apparatus that enables positioning of an end of an optical fiber even without the use of a ferrule.

A lighting apparatus according to an aspect of the present disclosure is a lighting apparatus that wavelength-converts laser light guided by an optical fiber to output light having a different wavelength as the laser light, and includes: a holder that holds the optical fiber; a wavelength converter that wavelength-converts the laser light emitted from the optical fiber; and a case that holds the wavelength converter and houses the holder, wherein the holder includes a groove into which one end of the optical fiber is fitted, the groove being straight.

The present disclosure can provide a lighting apparatus that enables positioning of an end of an optical fiber even without the use of a ferrule.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, lighting apparatuses according to exemplary embodiments of the present disclosure will be described with reference to the drawings. It should be noted that each of the subsequently-described exemplary embodiments shows a specific example. Therefore, numerical values, shapes, materials, structural components, the arrangement and connection of the structural components, etc. shown in the following exemplary embodiments are mere examples, and are not intended to limit the scope of the present disclosure. Furthermore, among the structural components in the following exemplary embodiments, components not recited in any one of the independent claims which indicate the broadest concepts of the present disclosure are described as arbitrary structural components.

Furthermore, the respective figures are schematic diagrams and are not necessarily precise illustrations. In addition, in the respective diagrams, identical structural components are given the same reference signs.

Embodiment

Hereinafter, lighting apparatus 1 according to an exemplary embodiment of the present disclosure will be described with reference to the drawings.

Figure 1:
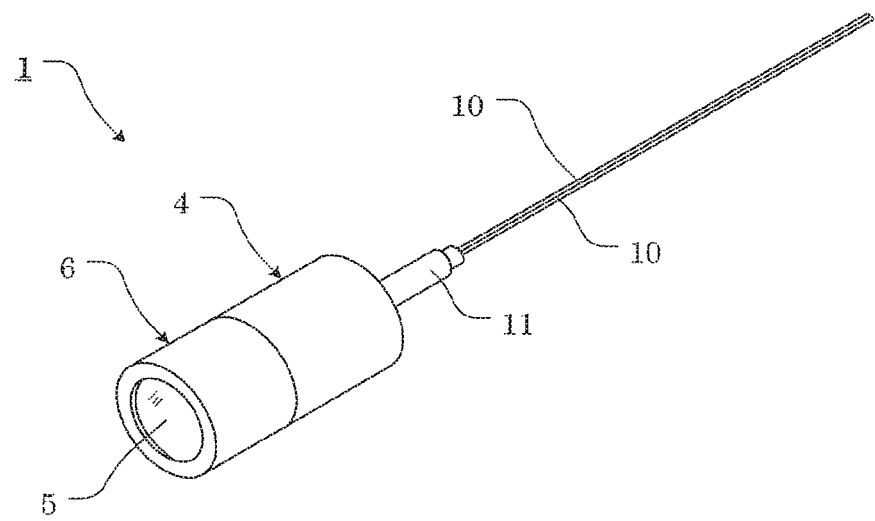
FIG. 1 is an external perspective view of a configuration of a lighting apparatus according to an exemplary embodiment.
Figure 2:
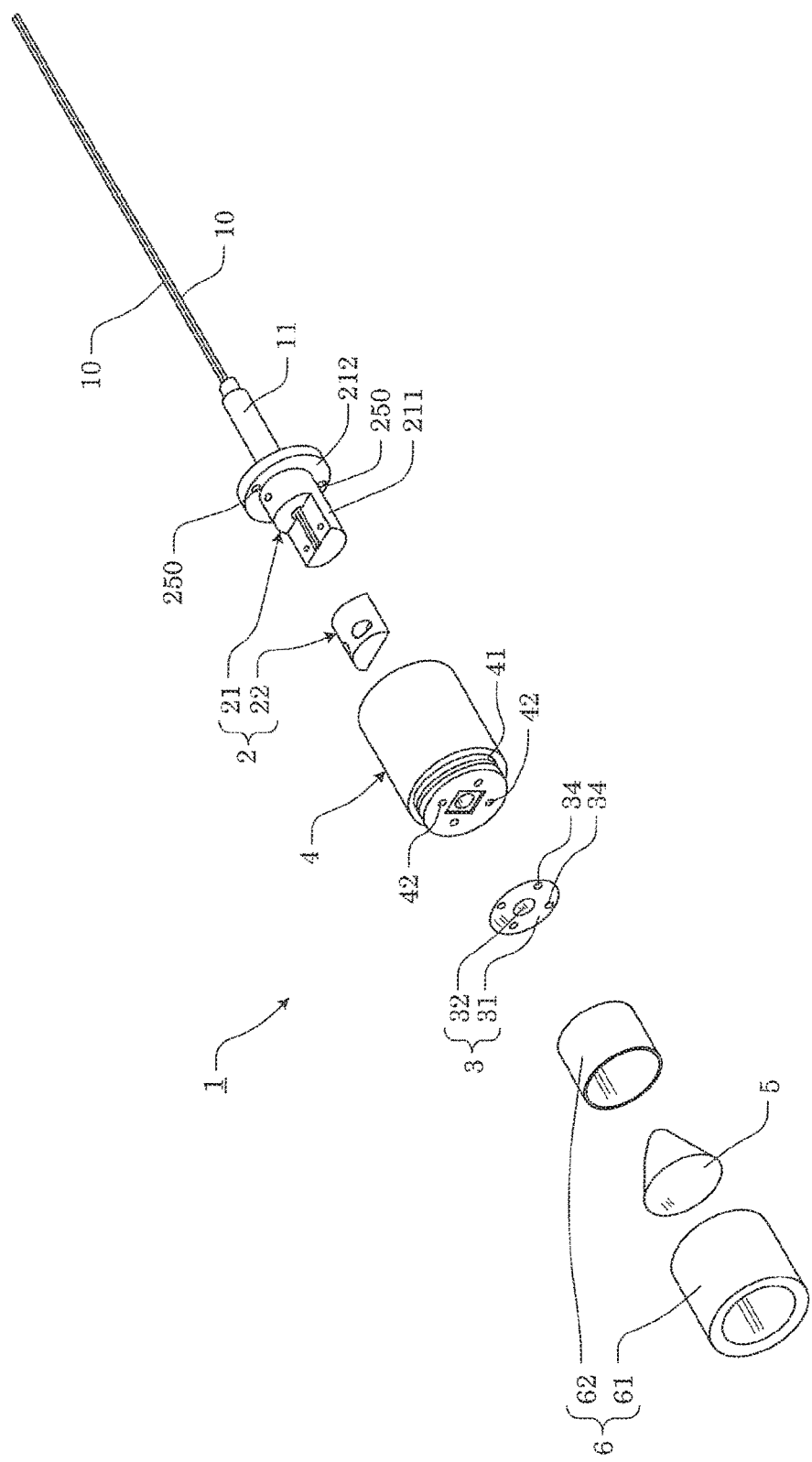
FIG. 2 is an exploded perspective view of the lighting apparatus in FIG. 1.
Figure 3:
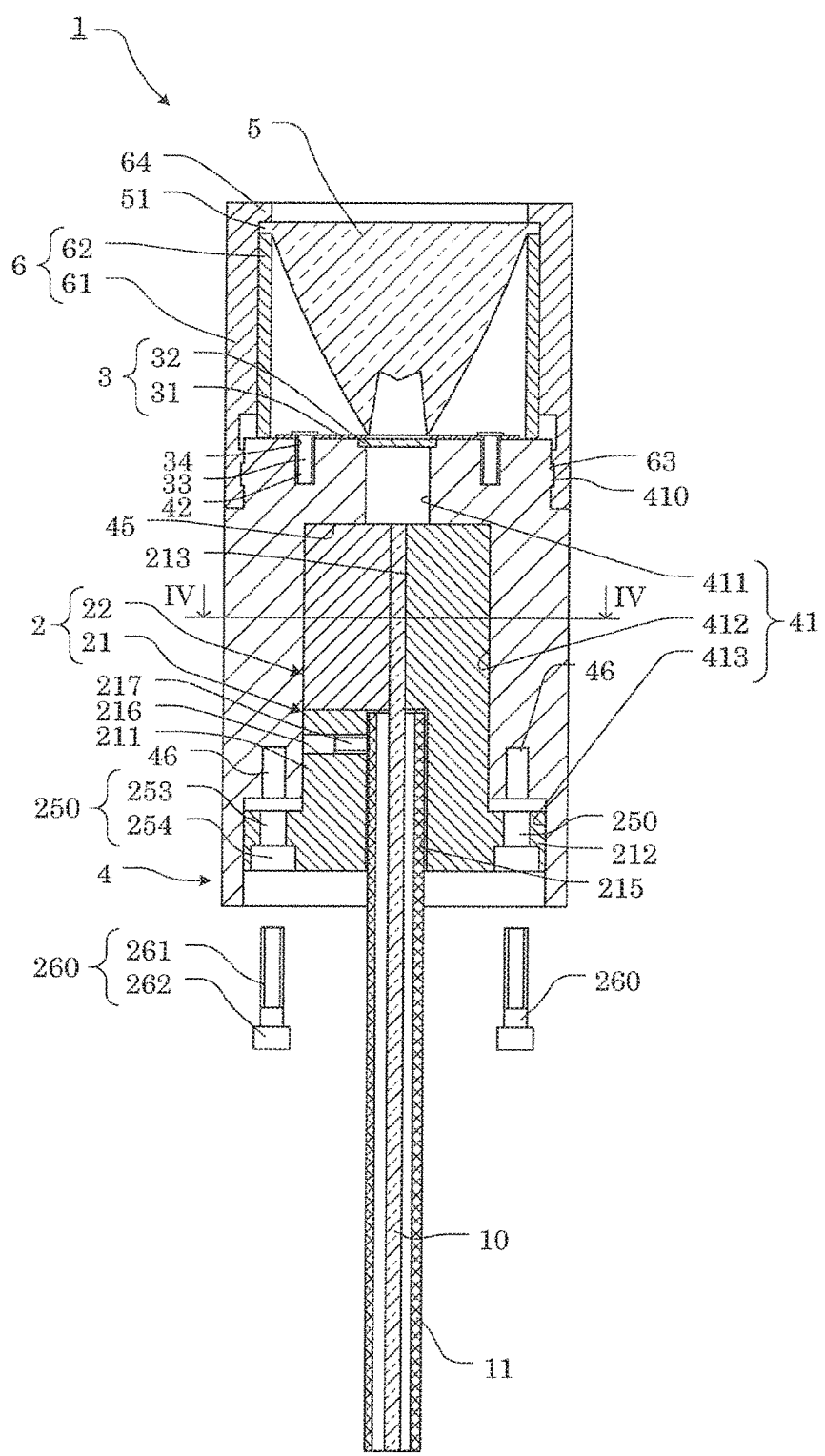
FIG. 3 is cross-sectional view of the lighting apparatus in FIG. 1.

First, the configuration of lighting apparatus 1 will be described. FIG. 1 is an external perspective view of the configuration of lighting apparatus 1 according to this embodiment. FIG. 2 is an exploded perspective view of lighting apparatus 1 in FIG. 1. FIG. 3 is a cross-sectional view of lighting apparatus 1 in FIG. 1.

As illustrated in FIG. 1 to FIG. 3, lighting apparatus 1 includes holder 2, wavelength converter 3, case 4, lens 5, and lens holder 6.

[Holder]

Holder 2 is a component that holds optical fibers 10. Specifically, holder 2 includes first component 21 and second component 22, and optical fibers 10 are held when first component 21 and second component 22 are in an attached state. In this embodiment, a pair of optical fibers 10 arranged side-by-side in a radial direction are held in holder 2 in the state where optical fibers 10 are housed inside protective tube 11. It should be noted that the number of optical fibers 10 collectively held by holder 2 may be one or three or more. Furthermore, laser light beams emitted by a light emitter (for example, a semiconductor laser diode that outputs short-wavelength light of at least 500 nm) not illustrated in the figures enter from base end faces of the pair of optical fibers 10. The laser light beams guided by optical fibers 10 are emitted from lead end faces (light emission faces) of optical fibers 10.

Figure 4:
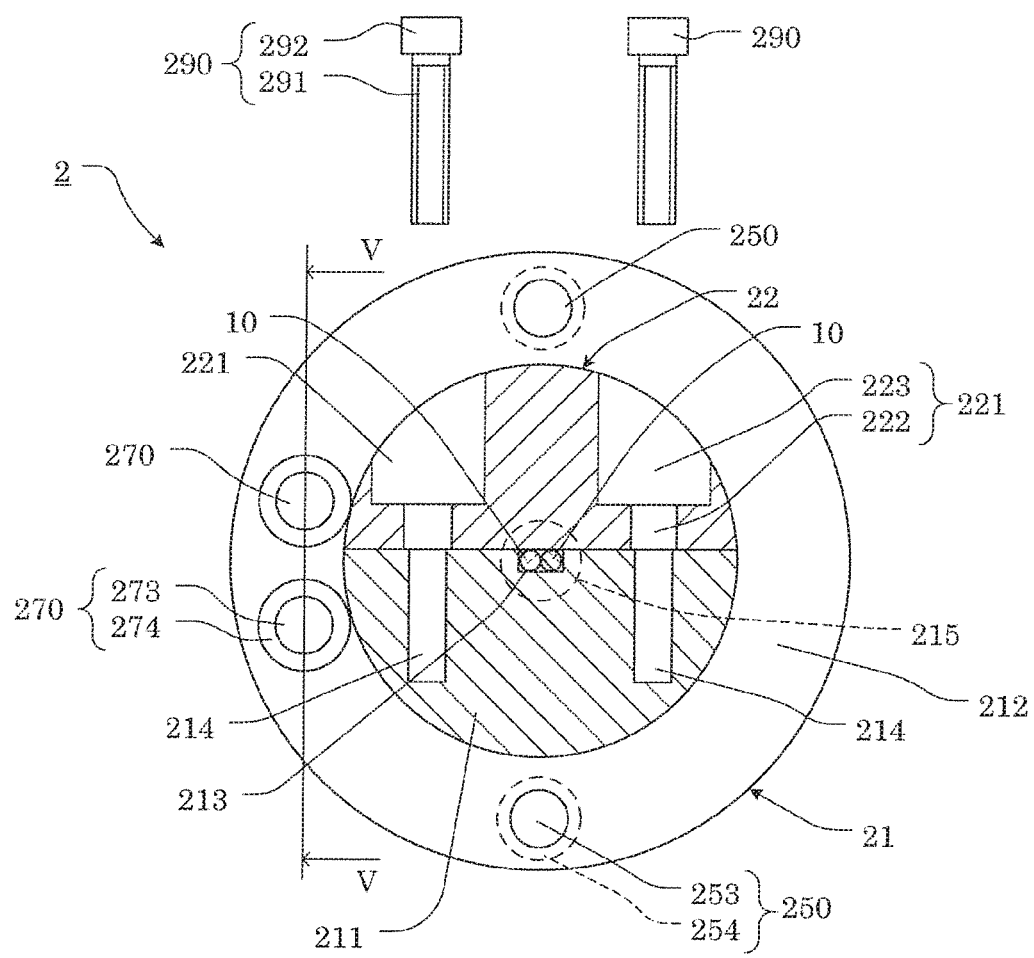
FIG. 4 is a cross-sectional view of an outline configuration of a holder according to the embodiment.

FIG. 4 is a cross-sectional view of an outline configuration of holder 2 according to this embodiment. Specifically, FIG. 4 is a cross-sectional view of holder 2 taken along line IV-IV in FIG. 3. In FIG. 4, illustration of case 4 is omitted.

[First Component]

As illustrated in FIG. 3 and FIG. 4, first component 21 is a component made of metal or resin, and includes main body 211 and flange 212. Main body 211 is formed into a shape obtained by cutting-out a lead end portion of a columnar component into a half-column shape. A linear groove 213 running along the axis direction of main body 211 is formed in a flat portion of the half-column portion of main body 211. Furthermore, a pair of screw holes 214 extending in a direction orthogonal to the flat portion is formed in the flat portion of the half-column portion of main body 211. Furthermore, a linear holding hole 215 connecting with groove 213 is formed in main body 211. Optical fibers 10 are disposed inside holding hole 215 and groove 213. The lead ends (one ends) of the pair of optical fibers 10 arranged side-by-side in a radial direction are collectively fitted into groove 213. The light emission faces (lead end faces) of optical fibers 10 are disposed flush with the lead end face of main body 211. Specifically, laser light beams are emitted by optical fibers 10 from the lead end face of main body 211.

Furthermore, optical fibers 10 are disposed, together with protective tube 11, inside holding hole 215. Screw hole 216 running along the radial direction of main body 211 is formed in main body 211 so as to connect with holding hole 215. By screwing set screw 217 in screw hole 216 so as to pin down protective tube 11 using set screw 217, the pair of optical fibers 10 and protective tube 11 can be secured inside holding hole 215.

Flange 212 projects from the outer circumferential face of the base end of main body 211, and runs continuously over the entire circumference. It should be noted that flange 212 may project intermittently from the outer circumferential face of the base end of main body 211, and may provided in only a portion of the outer circumferential face of the base end of main body 211. In addition, a pair of securing holes 250 are formed parallel to the axis direction in flange 212, at opposing positions across main body 211. Securing holes 250 are holes for attaching case 4 to first component 21 using first screws 260. Specifically, each of securing holes 250 includes first shaft hole 253 which is disposed on the lead end-side of flange 212 and into which shaft 261 of first screw 260 is inserted, and first counterbore 254 which is disposed on the base end-side of flange 212 to connect with first shaft hole 253, and inside which head 262 of first screw 260 is housed. First counterbores 254 are formed in the shape of circles with larger diameters than first shaft holes 253.

Figure 5:
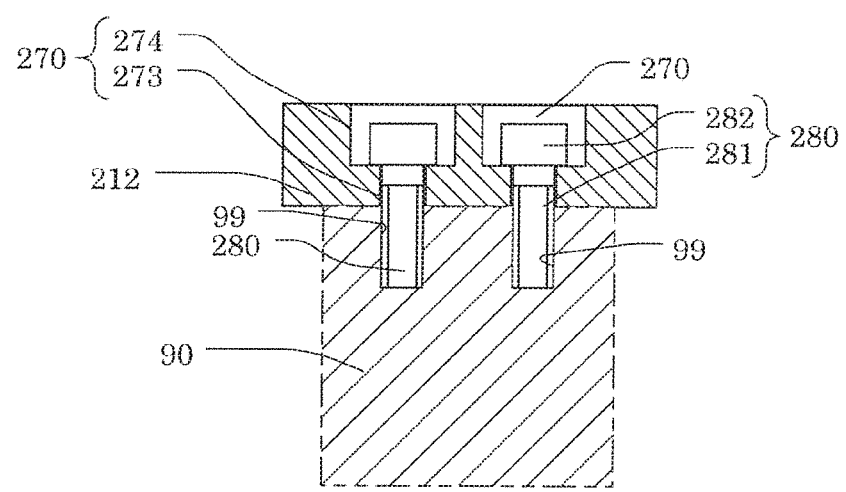
FIG. 5 is a cross-sectional view of an outline configuration of a flange according to the embodiment.

FIG. 5 is a cross-sectional view of an outline configuration of flange 212 according to this embodiment. Specifically, FIG. 5 is a cross-sectional view of flange 212 taken along line V-V in FIG. 4.

As illustrated in FIG. 4 and FIG. 5, a pair of securing holes 270 are formed parallel to the axis direction in flange 212, at adjacent positions different from the positions of securing holes 250. Securing holes 270 are holes for attaching holder 2 to support 90 for supporting lighting apparatus 1, using second screws 280. Specifically, each of securing holes 270 includes second shaft hole 273 which is disposed on the base end-side of flange 212 and into which shaft 281 of second screw 280 is inserted, and second counterbore 274 which is disposed on the lead end-side of flange 212 to connect with second shaft hole 273, and inside which head 282 of second screw 280 is housed. Second counterbores 274 are formed in the shape of circles with larger diameters than second shaft holes 273.

On the other hand, screw holes 99 corresponding to respective securing holes 270 are formed in support 90. When screw holes 99 and securing holes 270 of first component 21 are aligned, and second screws 280 are inserted into securing holes 270 and screwed into screw holes 99, first component 21 is secured to support 90.

[Second Component]

As illustrated in FIG. 3 and FIG. 4, second component 22 is a component formed in a half-column shape A pair of securing holes 221 are formed in second component 22, penetrating from the outer circumferential face up to the flat portion. Securing holes 221 extend in a direction orthogonal to the flat portion, and communicate with screw holes 214 of first component 21 when second component 22 is attached to first component 21. In other words, securing holes 221 are holes for securing second component 22 to first component 21 using third screws 290. Specifically, each of securing holes 221 includes third shaft hole 222 which is disposed in the flat portion-side of second component 22 and into which shaft 291 of third screw 290 is inserted, and third counterbore 223 which is disposed on the outer circumferential face-side of second component 22 to connect with third shaft hole 222, and inside which head 292 of third screw 290 is housed. Third counterbores 223 are formed in the shape of circles with larger diameters than third shaft holes 222. Then, when attaching second component 22 to first component 21, the flat portions of second component 22 and first component 21 are laid on top of each other, third screws 290 are inserted into securing holes 221 and screwed into screw holes 214. With this, second component 22 is secured to first component 21, and second component 22 and first component 21 form a columnar portion. Furthermore, heads 292 of third screws 290 are house inside corresponding third counterbores 223. At this time, the lead ends of optical fibers 10 fitted in groove 213 of first component 21 are pinned down by second component 22. In other words, second component 22 is a pressing component that pins down the lead ends of optical fibers 10. In this manner, since the lead ends of optical fibers 10 are pinned down by second component 22, displacement of the lead ends of optical fibers 10 from groove 213 is prevented.

[Wavelength Converter]

As illustrated in FIG. 2 and FIG. 3, wavelength converter 3 is held in case 4 so as to be located opposite the light emission faces of optical fibers 10. Wavelength converter 3 is an optical element that converts the wavelength of the laser light beams emitted from the light emission faces of optical fibers 10 into a different wavelength to emit light of a predetermined color. Wavelength converter 3 includes substrate 31 and fluorescent portion 32.

Substrate 31 holds fluorescent portion 32 and is, for example, an annular substrate. A plurality of insertion holes 34 for securing substrate 31 to case 4 via screws 33 are firmed in the periphery of substrate 31, at predetermined intervals in the circumferential direction.

Fluorescent portion 32 is attached to substrate 31 to cover the hole at the center of substrate 31. Fluorescent portion 32 includes, in a dispersed state, particles of phosphor that emits fluorescence when excited by laser light, for example, and the phosphor emits fluorescence when irradiated with laser light. Specifically, fluorescent portion 32 can be exemplified as a component in which phosphor particles are dispersed inside a base material comprising a transparent resin or glass, or a component in which phosphor particles are packed tightly together, etc.

In this embodiment, fluorescent portion 32 radiates white light, and includes, in an appropriate ratio, two types of phosphors: red phosphor that emits red light and yellow phosphor that emits yellow light, when irradiated with laser light. Furthermore, fluorescent portion 32 may include three types of phosphors: red phosphor that emits red light, blue phosphor that emits blue light, and green phosphor that emits green light, when irradiated with laser light.

Although there is no particular limitation as to the type or characteristics of the phosphors, it is desirable for the phosphors to have high heat resistance since laser light having a comparatively high output serves as the excitation light. Furthermore, although there is no particular limitation as to the type of the base material which holds the phosphors in a dispersed state, it is desirable to have a base material with higher transparency because white light radiation efficiency also improves. Furthermore, since laser light with comparatively high output will be entering, a base material with high heat resistance is desirable.

[Case]

Case 4 is a housing formed from a metal with a high heat dissipation property such as an Fe-based alloy (SUS, SF material, etc.) or a Cu-based alloy (brass, etc.). As illustrated in FIG. 3, case 4 is formed into a substantially cylindrical (i.e., round tube) shape, and male screw thread 410 for securing lens holder 6 is formed on the outer circumferential face of the lead end portion of case 4. Furthermore a plurality of screw holes 42 for securing wavelength converter 3 are formed in the lead end face of case 4. By placing wavelength converter 3 on the lead end face of case 4 and aligning insertion holes 34 of wavelength converter 3 and screw holes 42 of case 4, then screwing screws 33 into screw holes 42 via insertion holes 34, wavelength converter 3 is secured to the lead end face of case 4. With this securing, substrate 31 and fluorescent portion 32 of wavelength converter 3 are connected to case 4. As such, the heat generated in fluorescent portion 32 is directly transmitted to case 4 and transmitted to case 4 via substrate 31, and is released to the outside from case 4.

Holder 2 is housed inside case 4. Specifically, through hole 41 is formed at the center of the lead end face of case 4, along the axis direction. Through hole 41 penetrates from the lead end face up to the base end face of case 4. Holder 2 is housed inside through hole 41. Wavelength converter 3 is disposed coaxially with through hole 41. It should be noted that although the case where wavelength converter 3 covers through hole 41 from the outside of through hole 41 is given as an example in this embodiment, it is sufficient that wavelength converter 3 be disposed coaxially with through hole 41. In other words, wavelength converter 3 need not cover through hole 41, and may be disposed inside through hole 41.

Through hole 41 is formed into a shape having an inner circumference that decreases in stages (monotonic decrease) from the base end face (first end face) to the lead end face (second end face) of case 4. Specifically, through hole 41 includes, sequentially from the lead end side, small-diameter portion 411, medium-diameter portion 412, and large-diameter portion 413. Small-diameter portion 411, medium-diameter portion 412, and large-diameter portion 413 are coaxially-disposed columnar holes.

Small-diameter portion 411 serves as an optical path that guides the laser light beams emitted from optical fibers 10 up to fluorescent portion 32 of wavelength converter 3. Stated differently, the light emission faces of optical fibers 10 held in holder 2 are located opposite fluorescent portion 32 of wavelength converter 3, via small-diameter portion 411.

Holder 2 is housed in medium-diameter portion 412 and large-diameter portion 413. Specifically, main body 211 of first component 21 of holder 2 and second component 22 are housed in medium-diameter portion 412, and flange 212 of first component 21 is housed in large-diameter portion 413.

Medium-diameter portion 412 is a first portion into which main body 211 of holder 2 is fitted together with second component 22. Specifically, the inner diameter of medium-diameter portion 412 is formed into a size for fitting the columnar portion formed by the attachment of main body 211 of first portion 21 and second component 22. This fitting determines the position of holder 2 in the direction orthogonal to the axis direction, and thus also determines the position, in the direction orthogonal to the axis direction, of optical fibers 10 held in holder 2.

Furthermore, a lead end-side bottom face of medium-diameter portion 412 is abutting face 45 which each of lead end face of first component 21 and the leading end face of second component 22 of holder 2 abuts. By having the lead end face of first component 21 and the lead end of second component 22 abut abutting face 45, positioning of the light emission faces of optical fibers 10 held in holder 2 can be carried out. The interval between abutting face 45 and fluorescent portion 32 is set to a length which enables appropriate positioning of the light emission faces of optical fibers 10 held in holder 2 with respect to fluorescent portion 32.

Large-diameter portion 413 is a second portion that is disposed further on the base end-side than medium-diameter portion 412, and is formed into a shape for housing flange 212. Since the entirety of holder 2 fits inside case 4 when flange 212 is housed inside large-diameter portion 413, the external appearance can be made to impart a neat impression.

Furthermore, a plurality of first screw holes 46 with which respective securing holes 250 of flange 212 are aligned in a straight line are formed in the lead end-side bottom face of large-diameter portion 413. When shafts 261 of first screws 260 are screwed into first screw holes 46 via securing holes 250 of flange 212 housed in large-diameter portion 413, holder 2 is secured to case 4. Since heads 262 of first screws 260 are housed in first counterbores 254 of securing holes 250 after the securing, the entirety of first screws 260 fits inside case 4, and deterioration of aesthetic appearance of lighting apparatus 1 as a whole is suppressed.

[Lens]

As illustrated in FIG. 3, lens 5 is a light-distribution control lens which controls the light distribution of light resulting from the wavelength conversion by fluorescent portion 32 of wavelength converter 3. The opposing face of lens 5 which is opposed to fluorescent portion 32 is shaped to be able to take in as much of the light emitted from fluorescent portion 32 as possible without leakage. The shape of the opposing face of lens 5 is optimized under the premise that the positional relationship (i.e., the gap) between lens 5 and fluorescent portion 32 is constant. Projection 51 is formed around the entire circumference of the outer circumferential face of the lead end of lens 5, and engagement of projection 51 with lens holder 6 causes lens 5 to be held by lens holder 6.

[Lens Holder]

As illustrated in FIG. 3, lens holder 6 is a part which holds lens 5, and includes exterior body 61 and holding member 62. Exterior body 61 is a substantially cylindrical component formed from metal or resin, inside of which lens 5 and holding member 62 are housed. Female screw thread 63 to which male screw thread 410 of case 4 is screwed is formed in the base end inner circumferential face of exterior body 61. Furthermore, projection 64 projecting inward is formed around the entire circumference of the lead end inner circumferential face of exterior body 61. Projection 64 abuts projection 51 of lens 5.

Holding member 62 is a substantially cylindrical component formed from metal or resin, inside of which lens 5 is housed. The lead end of holding member 62 abuts projection 51 of lens 5. Specifically, when exterior body 61 is screwed onto case 4 in the state where lens 5 and holding member 62 are housed inside exterior body 61, projection 51 of lens 5 is held between the lead end of holding member 62 and projection 64 of exterior body 61. Accordingly, positioning of lens 5 is carried out.

Next, the method of assembling lighting apparatus 1 will be described.

From the state illustrated in FIG. 2, wavelength converter 3 is attached to case 4 using screws 33. Subsequently, lens 5 and lens holder 6 are attached to case 4. Specifically, female screw thread 63 of exterior body 61 housing lens 5 and holding member 62 is screwed with male screw thread 410 of case 4 to thereby attach lens 5 and lens holder 6 to case 4.

On the other hand, the pair of optical fibers 10 are attached to first component 21 of holder 2 via protective tube 11. Specifically, the pair of optical fibers 10 and protective tube 11 are inserted into holding hole 215 of first component 21. At this time, the lead ends of the pair of optical fibers 10 are pulled out from protective tube 11 and fitted into groove 213 of first component 21. Next, by screwing set screw 217 into screw hole 216 of first component 21, the pair of optical fibers 10 and protective tube 11 are secured inside holding hole 215.

Subsequently, second component 22 is attached to first component 21. Specifically, as illustrated in FIG. 4, the respective flat portions of second component 22 and first component 21 are laid on top of each other, and third screws 290 are inserted inside securing holes 221 and screwed into screw holes 214. With this, second component 22 is secured to first component 21, and second component 22 and first component 21 form a columnar portion. At this time, heads 292 of third screws 290 are housed inside third counterbores 223 and do not protrude from second component 22.

Here, before holder 2 is attached to case 4, first component 21 of holder 2 is attached to support 90 for supporting lighting apparatus 1. Specifically, as illustrated in FIG. 5, when screw holes 99 of support 90 and securing holes 270 of first component 21 are aligned, and second screws 280 are inserted into securing holes 270 and screwed into screw holes 99, first component 21 is secured to support 90. After the securing, heads 282 of second screws 280 are housed inside second counterbores 274 and do not protrude from first component 21.

Next, as illustrated in FIG. 3, holder 2 is attached to case 4. Specifically, holder 2 is inserted and fitted inside medium-diameter portion 412 of through hole 41 of case 4. This fitting determines the position of holder 2 in the direction orthogonal to the axis direction. Furthermore, since the lead end face of holder 2 abuts abutting face 45 of case 4 after the aforementioned insertion, the axis direction position of holder 2 is determined. Accordingly, the positions, in the axis direction and the direction crossing the axis direction, of the light emission faces of optical fibers 10 in holder 2 are determined.

Subsequently, holder 2 is secured to case 4. Specifically, when securing holes 250 of first component 21 and first screw holes 46 of case 4 are aligned and first screws 260 are inserted inside securing holes 250 and screwed in first screw holes 46, holder 2 is secured to case 4. After the securing, heads 262 of first screws 260 are housed inside first counterbores 254 and do not protrude from first component 21. After assembly, lighting apparatus 1 assumes the state illustrated in FIG. 1 and FIG. 3.

As described above, according to this embodiment, lighting apparatus 1 is a lighting apparatus that wavelength-converts laser light guided by optical fibers 10 to output light having a different wavelength as the laser light. Lighting apparatus 1 includes holder 2 that holds optical fibers 10, wavelength converter 3 that converts the wavelength of the laser light emitted from optical fibers 10, and case 4 that holds wavelength converter 3 and houses holder 2. Holder 2 includes groove 213 that is straight and into which lead ends of optical fibers 10 are fitted.

Accordingly, since linear groove 213 into which the lead ends of optical fibers 10 are fitted is formed in holder 2, fitting optical fibers 10 into groove 213 makes it possible to carry out the positioning of the lead ends of optical fibers 10. In other words, positioning of the lead ends of optical fibers 10 becomes possible even without using a ferrule.

Furthermore, holder 2 includes second portion 22 (pressing portion) that pins down the lead ends of optical fibers 10 fitted into groove 213.

Since the lead ends of optical fibers 10 are pinned down by second component 22, displacement of the lead ends of optical fibers 10 from groove 213 can be prevented. Therefore, stability of positioning of optical fibers 10 can be enhanced.

Furthermore, the plurality of optical fibers 10 arranged side-by-side in a radial direction are collectively fitted into groove 213.

Since a plurality of optical fibers 10 are collectively fitted into one groove 213, the labor involved during fabrication can be reduced compared to when one groove 213 is formed for each optical fiber 10.

(Variation 1)

In the foregoing embodiment, the case where groove 213 into which optical fibers 10 are fitted is formed only in first component 21 is given as an example. In Variation 1, the case where groove 223a is also formed in second component 22a is given as an example.

It should be noted that, in the subsequent description, the same reference signs are given to components that are the same as in the foregoing embodiment, and there are instances where their description is omitted.

Figure 6:
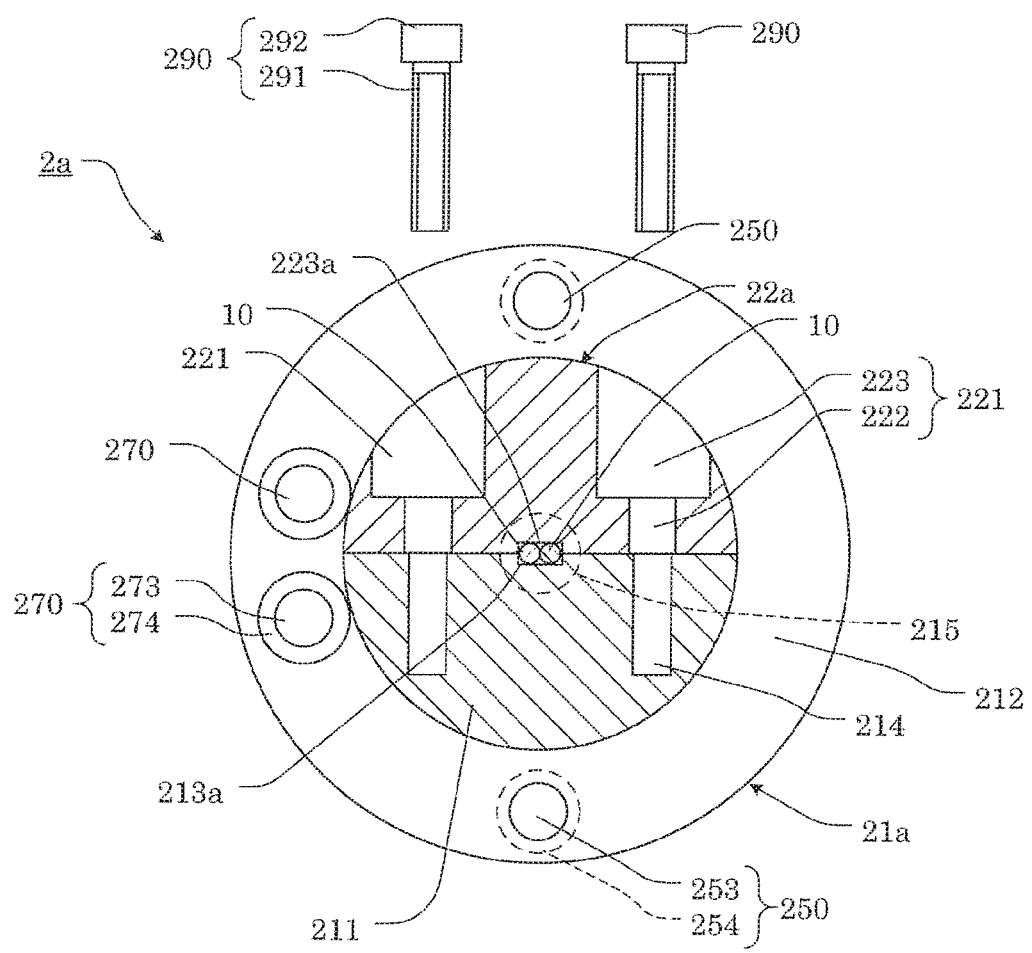
FIG. 6 is a cross-sectional view of an outline configuration of a holder according to Variation 1.

FIG. 6 is a cross-sectional view of an outline configuration of holder 2a according to Variation 1. Specifically, FIG. 6 is a diagram corresponding to FIG. 4.

As illustrated in FIG. 6 groove 213a of first component; 21a of holder 2a is formed into a shape for housing portions (in this variation, the bottom halves) of the pair of optical fibers 10. Groove 223a is formed in second component 22a, in a location opposite groove 213a of first component 21a. Groove 223a is formed into a shape for housing the portions (in this variation, the upper halves) of the pair of optical fibers 10 which protrude from groove 213a. The pair of optical fibers 10 are fitted inside grooves 213a and 223a. In this case too, optical fibers 10 can be pinned down using second component 22a.

(Variation 2)

In the foregoing embodiment, the case where optical fibers 10 are held by first component 21 and second component 22 is given as an example. In Variation 2, the case where optical fibers 10 are held by a pair of boards 91 and 92 which are separate components from first component 21b will be described.

Figure 7:
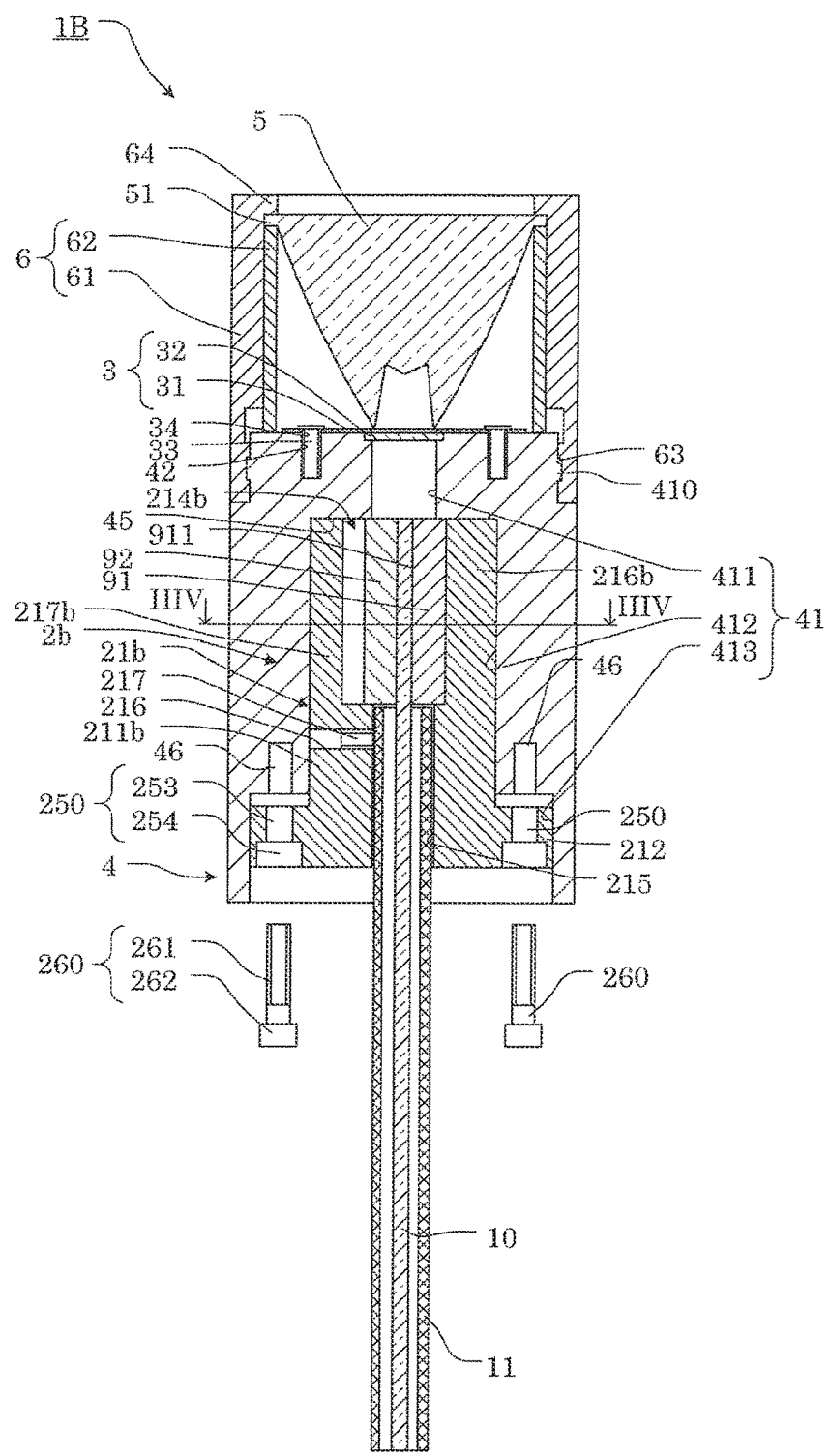
FIG. 7 is cross-sectional view of a lighting apparatus according to Variation 2.
Figure 8:
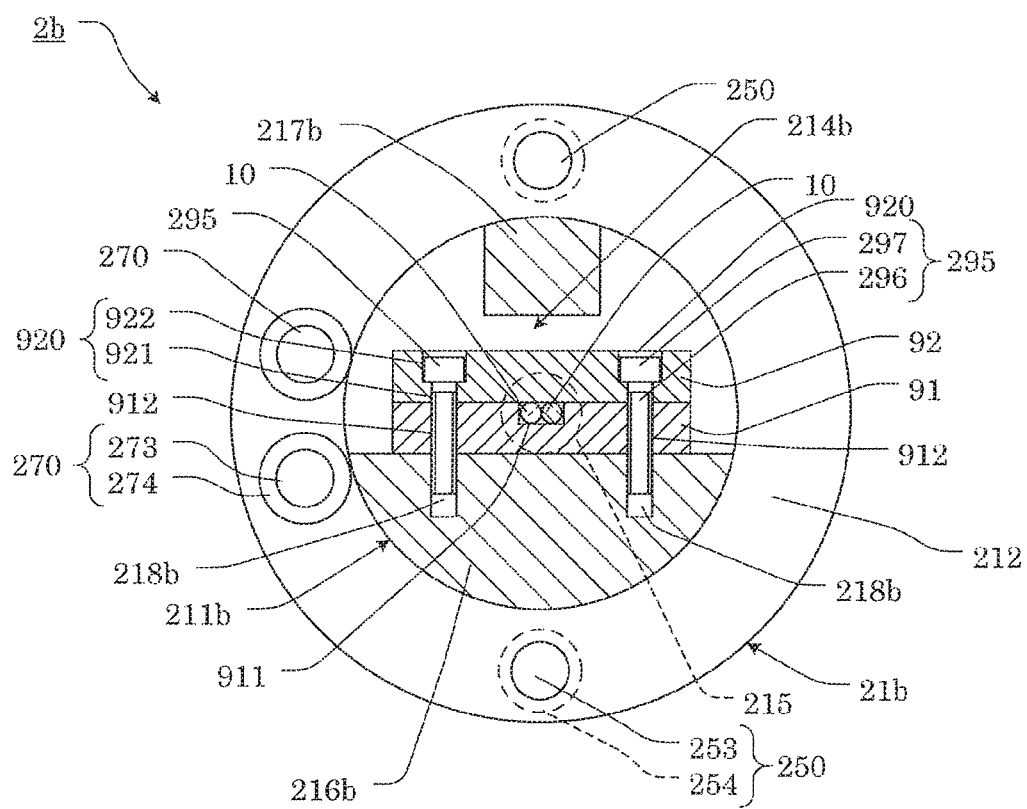
FIG. 8 is a cross-sectional view of an outline configuration of a holder according to Variation 2.

FIG. 7 is a cross-sectional view of lighting apparatus 1B according to Variation 2. Specifically, FIG. 7 is a diagram corresponding to FIG. 3. FIG. 8 is a cross-sectional view of an outline configuration of holder 2b according to Variation 2. Specifically, FIG. 8 is a cross-sectional view of holder 2 taken along line VIII-VIII in FIG. 7, and is a diagram corresponding to FIG. 4.

As illustrated in FIG. 7 and FIG. 8, holder 2b includes first component 21b and the pair of boards 91 and 92. Recess 214b which is cut out along the axis direction from the lead end face of first component 21b is formed in main body 211b of first component 21b. The pair of boards 91 and 92 are disposed inside recess 214b. A substantially half-column shaped first portion 216b and a columnar second portion 217b which opposes first component 216b with recess 214b disposed therebetween are provided in main body 211b. A pair of screw holes 218b for securing the pair of boards 91 and 92 are formed in the flat portion of first portion 216b. Furthermore, the pair of boards 91 and 92 are disposed on top of each other on the flat portion of first portion 216b.

Board 91 is a rectangular board that is placed on the flat portion of first portion 216b, and a linear groove 911 is formed on one major surface of board 91. When board 91 is disposed at a predetermined position on the flat portion of first portion 216b, groove 911 is aligned in a straight line with holding hole 215. The lead ends of the pair of optical fibers 10 are collectively fitted inside groove 911. Furthermore, a pair of insertion holes 912 connected to the pair of screw holes 218b are formed in board 91.

Board 92 is a rectangular board disposed on top of the major surface of board 91. Board 92 is a pressing component that pins down the lead ends of the pair of optical fibers 10 fitted in groove 911. A pair of securing holes 920 are formed in board 92, corresponding to insertion holes 912 of board 91. Securing holes 920 are holes for attaching boards 91 and 92 to first portion 216b, using screws 295. Specifically, each of securing holes 920 includes shaft hole 921 into which shaft 296 of screw 295 is inserted, and counterbore 922 which is connected to shaft hole 921 and inside which head 297 of screw 295 is housed. When screws 295 are inserted into securing holes 920 of board 92 and insertion holes 912 of board 91 and screwed into screw holes 218b of first portion 216b, the pair of boards 91 and 92 are secured to first portion 216b. Then, as illustrated in FIG. 7, lead end faces of the pair of boards 91 and 92 abut abutting face 45 of case 4, and thereby enabling the positioning of optical fibers 10 inside groove 911 of board 91. Furthermore, since optical fibers 10 are held by boards 91 and 92 which are separate components from first component 21b, optical fibers 10 can be attached to first component 21b after first being fitted into board 91 at a place different from first component 21b. Therefore, the degree of freedom of the fitting work for optical fibers 10 can be enhanced.

(Variation 3)

In the foregoing embodiment, the case where flange 212 of holder 2 is housed inside case 4 is given as an example. In Variation 3, the case where flange 212 is not housed in case 4 is given as an example.

Figure 9:
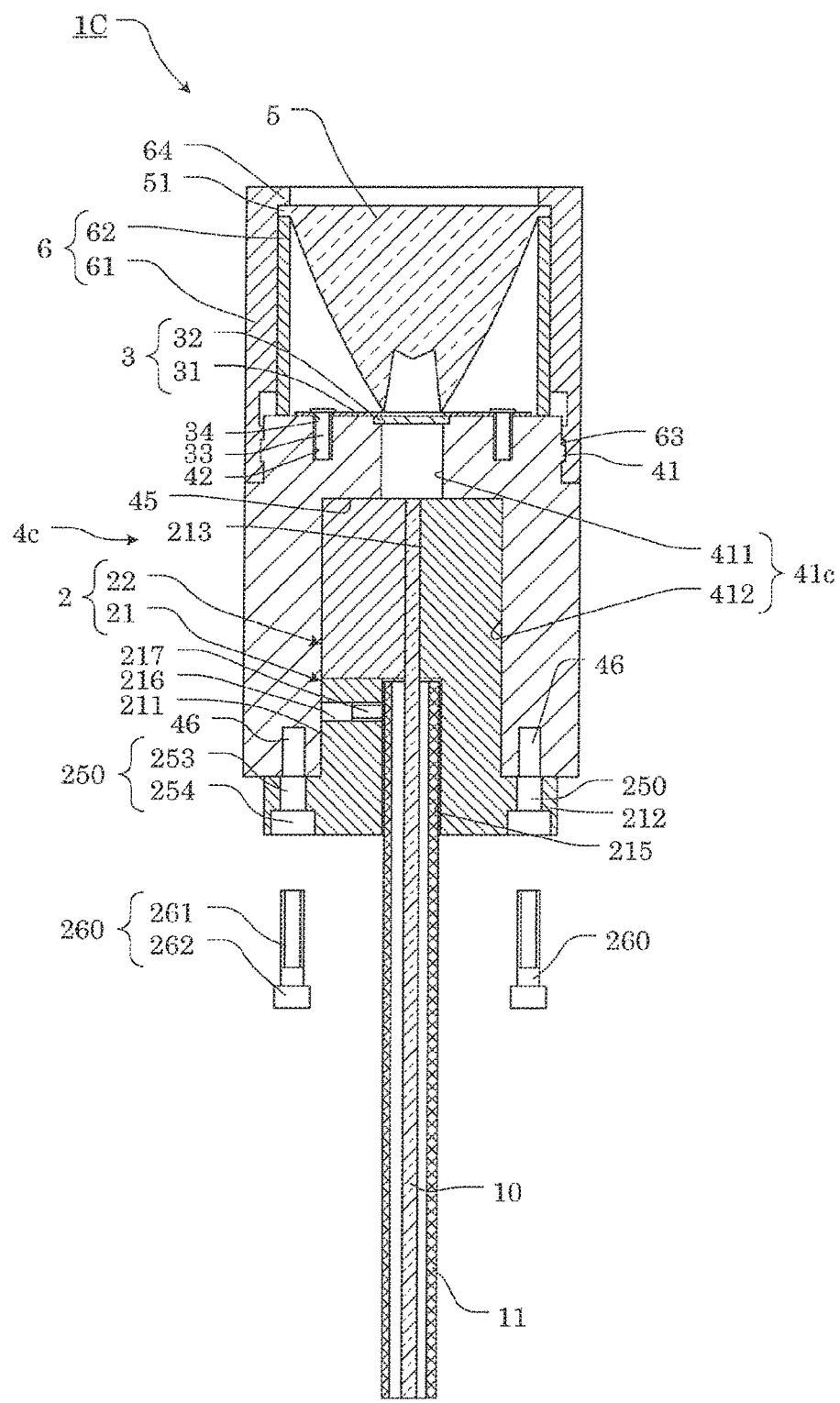
FIG. 9 is cross-sectional view of a lighting apparatus according to Variation 3.

FIG. 9 is a cross-sectional view of lighting apparatus 1C according to Variation 3. Specifically, FIG. 9 is a diagram corresponding to FIG. 3.

As illustrated in FIG. 9, through hole 41c having no large-diameter portion 413 is formed in case 4c of lighting apparatus 1C. As such, first screw holes 46 are formed in the base end face of case 4c. Accordingly, flange 212 of holder 2 is secured to the base end face of case 4c and protrudes from case 4c. It should be noted that it is acceptable to have only part of flange 212 housed in case 4c.

(Others)

Although lighting apparatuses according to the present disclosure are described thus far based on the foregoing exemplary embodiment and variations thereof, the present disclosure is not limited to the foregoing exemplary embodiment and variations thereof.

For example, in the foregoing embodiment, case 4 is exemplified as having a substantially cylindrical shape but may be of any shape as long it is tubular. A substantially square tube shape can be given as another shape for case 4. Furthermore, holder 2 may also be of any shape as long as it is a shape that can be housed inside through hole 41 of case 4.

Furthermore, in the foregoing embodiment, the case where a plurality of optical fibers 10 are fitted into one groove 213 is given as an example. However, a plurality of grooves may be formed in the holder and one optical fiber may be fitted in each of the grooves.

Furthermore, in the foregoing embodiment, the case where flange 212 of holder 2 is screw-fastened to case 4 is given as an example. However, the method of securing flange 212 to case 4 may be any method. Securing by interfitting or securing by adhesives, etc., may be given as other securing methods. It should be noted that when flange 212 of holder 2 is detachably secured to case 4, workability during maintenance can be enhanced.

Forms obtained by various modifications to the exemplary embodiments that can be conceived by a person of skill in the art as well as forms realized by arbitrarily combining structural components and functions in the respective exemplary embodiment which are within the scope of the essence of the present invention are included in the present invention.

What is claimed is:

1. A lighting apparatus that wavelength-converts laser light guided by an optical fiber to output light having a different wavelength as the laser light, the lighting apparatus comprising:
   a holder that holds the optical fiber;
   a wavelength converter that wavelength-converts the laser light emitted from the optical fiber; and
   a case that holds the wavelength converter and houses the holder, wherein
   the holder includes a groove into which one end of the optical fiber is fitted, the groove being straight.

2. The lighting apparatus according to claim 1, wherein the holder includes a pressing component that pins down the one end of the optical fiber fitted into the groove.

3. The lighting apparatus according to claim 2, wherein the holder includes a first board in which the groove is formed and a second board which is the pressing component, the first board and the second board being disposed on top of each other.

4. The lighting apparatus according to claim 1, wherein the optical fiber comprises a plurality of optical fibers that are arranged side-by-side in a radial direction and collectively fitted into the groove.

5. The lighting apparatus according to claim 1, wherein the holder includes a flat portion that extends in an axial direction of the optical fiber, wherein the groove is formed on the flat portion.

6. The lighting apparatus according to claim 1, further comprising:
   the holder having a linear hole penetrating therethrough, wherein the linear hole is connected to the groove.

7. The lighting apparatus according to claim 6, wherein the one end of the optical fiber is a protruding end that protrudes from the linear hole so as to be fitted in the groove.

\* \* \* \* \*